US006202057B1

(12) United States Patent
Pierce

(10) Patent No.: US 6,202,057 B1
(45) Date of Patent: Mar. 13, 2001

(54) POSTAGE METERING SYSTEM AND METHOD FOR A SINGLE VAULT DISPENSING POSTAGE TO A PLURALITY OF PRINTERS

(75) Inventor: Perry A. Pierce, Darien, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 08/993,357

(22) Filed: Dec. 18, 1997

(51) Int. Cl.[7] ...................................................... G06F 17/00
(52) U.S. Cl. ............................................................ 705/408
(58) Field of Search .................................... 705/400, 401, 705/403, 410, 408, 60, 61, 62; 395/200.3, 200.33, 200.47, 200.48, 200.49; 709/200, 203, 217, 218, 219; 713/176, 180

(56) References Cited

U.S. PATENT DOCUMENTS

| | | | | |
|---|---|---|---|---|
| 4,447,890 | | 5/1984 | Duwel et al. | 705/403 |
| 4,725,718 | | 2/1988 | Sansone et al. | 235/495 |
| 4,743,747 | | 5/1988 | Fougere et al. | 235/494 |
| 4,757,537 | | 7/1988 | Edelmann et al. | 380/51 |
| 4,760,532 | * | 7/1988 | Sansone et al. | 364/464 |
| 4,775,246 | | 10/1988 | Edelmann et al. | 705/62 |
| 4,802,218 | | 1/1989 | Wright et al. | 705/60 |
| 4,812,994 | | 3/1989 | Taylor et al. | 705/410 |
| 4,831,555 | | 5/1989 | Sansone et al. | 358/1.14 |
| 4,837,701 | | 6/1989 | Sansone et al. | 705/404 |
| 4,853,865 | | 8/1989 | Sansone et al. | 705/404 |
| 4,853,961 | | 8/1989 | Pastor | 713/176 |
| 4,864,506 | * | 9/1989 | Storace | 705/403 |
| 4,873,645 | | 10/1989 | Hunter et al. | 700/231 |
| 5,142,577 | | 8/1992 | Pastor | 705/62 |
| 5,377,268 | | 12/1994 | Hunter | 705/63 |
| 5,448,641 | | 9/1995 | Pintsov et al. | 380/51 |
| 5,454,038 | | 9/1995 | Cordery et al. | 705/60 |
| 5,510,992 | | 4/1996 | Kara | 705/408 |
| 5,606,507 | | 2/1997 | Kara | 705/408 |
| 5,666,421 | | 9/1997 | Pastor et al. | 380/51 |
| 5,682,318 | | 10/1997 | Kara | 705/402 |
| 5,682,427 | | 10/1997 | Seestrom | 380/51 |
| 5,717,597 | | 2/1998 | Kara | 705/408 |
| 5,742,683 | | 4/1998 | Lee et al. | 705/60 |
| 5,781,438 | * | 7/1998 | Lee et al. | 364/464.14 |
| 5,793,867 | | 8/1998 | Cordery et al. | 705/60 |
| 5,802,175 | | 9/1998 | Kara | 380/277 |
| 5,812,991 | | 9/1998 | Kara | 705/410 |
| 5,819,240 | | 10/1998 | Kara | 705/408 |
| 5,822,738 | | 10/1998 | Shah et al. | 705/410 |
| 5,822,739 | * | 10/1998 | Kara | 705/410 |

FOREIGN PATENT DOCUMENTS 0 927 962 A2 * 7/1999 (EP) .

* cited by examiner

*Primary Examiner*—Emanuel Todd Voeltz
*Assistant Examiner*—Thomas A. Dixon
(74) *Attorney, Agent, or Firm*—Charles R. Malandra, Jr.; Michael E. Melton

(57) ABSTRACT

The present invention provides a postage metering system that includes a plurality of closed and open meter printer modules operatively connected as part of a metering network. A single postal security device (PSD) is coupled to the network, either directly, through a personal computer or through one of the printer modules. The PSD includes unique identification and the ability to store postal value and generate digital signatures. The printer modules function as a postage metering network wherein a printer module requests evidence of postage payment from the PSD for concluding a postage metering transaction. The printer module initiates the postage metering transaction in the PSD by sending a request for evidence of postage payment to the PSD. The PSD receives the request and sends the evidence of payment to the printer module for subsequent printing.

16 Claims, 6 Drawing Sheets

POSTAGE METERING SYSTEM AND METHOD FOR A SINGLE VAULT DISPENSING POSTAGE TO A PLURALITY OF PRINTERS

RELATED APPLICATIONS

The present application is related to the following U.S. patent applications Ser. Nos. 08/993,352, 08/993,353, 08/993,354, 08/993,355, 08/993,356 and 08/993,311, all filed concurrently herewith and assigned to the assignee of the present invention.

FIELD OF THE INVENTION

The present invention relates generally to a postage metering system and method for printing postage indicia using digital printing meters and, more particularly, to a postage metering system and method for printing postage indicia in a network of digital printing devices.

BACKGROUND OF THE INVENTION

Presently, there are two postage metering device types: closed systems and open systems. In a closed system, the system functionality is solely dedicated to metering activity. Examples of closed system metering devices, also referred to as postage evidencing devices, include conventional digital and analog (mechanical and electronic) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. Open system indicia printed by the non-dedicated printer is made secure by including addressee information in the encrypted evidence of postage printed on the mailpiece for subsequent verification.

Conventional closed system mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the accounting unit and printhead. See, for example, U.S. Pat. No. 4,802,218, issued to Christopher B. Wright et al and now assigned to the assignee of the present invention. An example of a digital printing postage meter with secure printhead communication is the Personal Post Office™ manufactured by Pitney Bowes Inc. of Stamford, Conn. An example of a digital printing postage meter in a secure housing is the PostPerfect™ also manufactured by Pitney Bowes Inc. of Stamford, Conn.

In even a modest size mailroom it is common that several meters are present. It has been shown that funds can be stored in one central location for batch mailing purposes where evidence of postage payment for batch mail printed at several printers is evidenced through the printing of a statement summarizing the postage for the batch of mail. See U.S. Pat. Nos. 4,760,532 and 4,837,701, each assigned to the assignee of the present invention. However, this scheme has limitations. First, the scheme is limited to batch mail processing without evidencing (franking) postage on each mailpiece. In addition, in large mailrooms it is common for mail to be processed for several different originating zip codes. Since each meter is assigned one originating zip code, meters are frequently moved from one mailing machine to another depending upon the mail processing needs.

In U.S. Pat. No. 4,837,701, a mail processing system is disclosed for processing batch mail utilizing a plurality of work stations, such as inserters. In U.S. Pat. No. 4,760,532, a mail processing system is disclosed for processing batch mail utilizing a single work station. However, in each case postage is evidenced by printing an accounting statement containing information accumulated during the processing of the batch of mailpieces. The accounting statement is a summary of the type and number of mailpieces processed and the amount of postage for the entire batch. Thus, in U.S. Pat. Nos. 4,760,532 and 4,837,701 the postage for each mailpiece is not evidenced on the mailpiece but by the accounting statement that must accompany the batch of mail when deposited with the post. The accounting statement is printed by a printer that is different than the printer used to prepare the mailpieces.

In U.S. Pat. No. 5,682,427, a postage metering system with dedicated and non-dedicated printing means is disclosed. However, in this postage metering system only the non-dedicated printer prints evidence of postage. The dedicated printer is part of a digital postage meter that is coupled to the processor that controls the non-dedicated printer. The digital postage meter is present solely to provide the processor and ultimately the non-dedicated printer with the encrypted information that is printed as evidence of postage. Since addressee information is included in the encrypted information, the non-dedicated printer prints open system evidence of postage.

SUMMARY OF THE INVENTION

It has been found that a single secure accounting and metering device can provide evidence of postage payment in real-time to a plurality of printers over a dedicated or non-dedicated network. The present invention provides franking of every mailpiece with digital token printed on each piece as if the accounting device was attached to the printer. The accounting and metering device can be connected to a computer or directly via modem to the data center for postage refills. In a large mailroom, the present invention reduces the cost of the conventional meter/mailing machines to only the cost of printers or mailing machines, since the funds accounting/token calculations occur within a single device for all printers or mailing machines.

In the present invention, there is one PSD that performs funds accounting and digital token calculations. A digital token is encrypted information, such as postage value, date and box identification, that authenticates the information imprinted on a mailpiece for authentication of the postage evidencing. The PSD contains all necessary hardware and software to perform all postage metering functions with the exception of printing, with a connection port for communication with printing systems on the network. The printing systems can either be open or closed systems which make requests to the PSD for digital tokens. The PSD provides a response including the digital tokens to be printed on the mailpiece.

The PSD can be refilled upon command from the user or be preset to refill when the balance drops below a particular level. Since the PSD is coupled to multiple printer devices that may not be in the same area, the box has the capability to provide accounting for each printer or each postal zip code defined in the system. In the preferred embodiment, the PSD keeps a log of how much postage was used by each accountable zip code and this information is sent securely to a Data Center during a funds refill so that the proper postal accounts can be credited for the mail generated. In previously noted related U.S. patent application Ser. No. 08/993,310, which is incorporated herein in its entirety, a multiple registered PSD (meter) is described in detail.

It has been found that a closed metering system can be implemented on a conventional local area, or wide area network (including infrared and RF networks) to form a "Network Metering System". The Network Metering System includes a plurality of printer modules operatively coupled to a Network Server as part of the network. In an alternate embodiment, a plurality of PSDs are connected to a plurality of printer modules in a metering network. This alternate embodiment is described in previously noted U.S. patent application Ser. No. 08/993,356.

It has been found that by placing a single meter in a mailroom on a network it is possible to print postage dispensed from a particular meter on a mailing machine other than the one to which it is attached. A preferred embodiment of the present invention includes a single PSD coupled to the network, whereby authorized ones of the printer modules on the network can obtain postage evidencing from the PSD. The accounting for debits and credits to the PSD and the logging of transactions are performed at the PSD.

There are several benefits that are realized from the present invention. One such benefit relates to the postal regulations requiring that the postage printed on a metered mailpiece must be obtained from a meter licensed from the local post office at which the mailpiece is deposited for mailing, commonly referred to as "origin of deposit" or "domain". With a single PSD having a plurality of sub accounting registers accessible over a network, a user at a printer module is not limited to a "single" PSD having a single origin of deposit or domain. For example, while most mailing machines of a network metering system may be configured to deposit their mailpieces in the Post Office in Shelton, Conn., other mailing machines may be configured to deposit their mailpieces at different origins of deposit, such as New Haven, Conn. Furthermore, a printer module that is physically connected to a PSD in Shelton, Conn., may be processing mail to be deposited in New Haven, Conn. Since the New Haven acceptance mail facility is open later than the Shelton Facility. The present invention provides each printer module on the network with access to a central funds accounting register having several origins of deposit within the same PSD.

The present invention provides a postage metering system that includes a plurality of closed and open meter printer modules (also referred to herein as meter printers) operatively connected as part of a metering network. A single postal security device (PSD) is coupled to the network, either directly, through a personal computer or through one of the printer modules. The PSD includes unique identification and the ability to store postal value and generate digital signatures. The printer modules function as a postage metering network wherein a printer module requests evidence of postage payment from the PSD for concluding a postage metering transaction. The printer module initiates the postage metering transaction in the PSD by sending a request for evidence of postage payment to the PSD. The PSD receives the request and sends the evidence of payment to the printer module for subsequent printing.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

It is well known that PC meters use open system meters. An open system meter's printing unit is not coupled to its PSD. However, in a conventional closed system the accounting unit (also referred to herein as PSD) and printing unit are coupled via a secure point to point communication link. It has been found that by placing a closed system PSD on a network a secure communications link can be routed over the network from the PSD to any closed system printing unit, allowing any mailing machine to print postage dispensed by any PSD on the network. Furthermore, it has been found that the PSD can be used to generate open system tokens that can be printed by non-dedicated printers coupled to a personal computer on the network.

Figure 1:
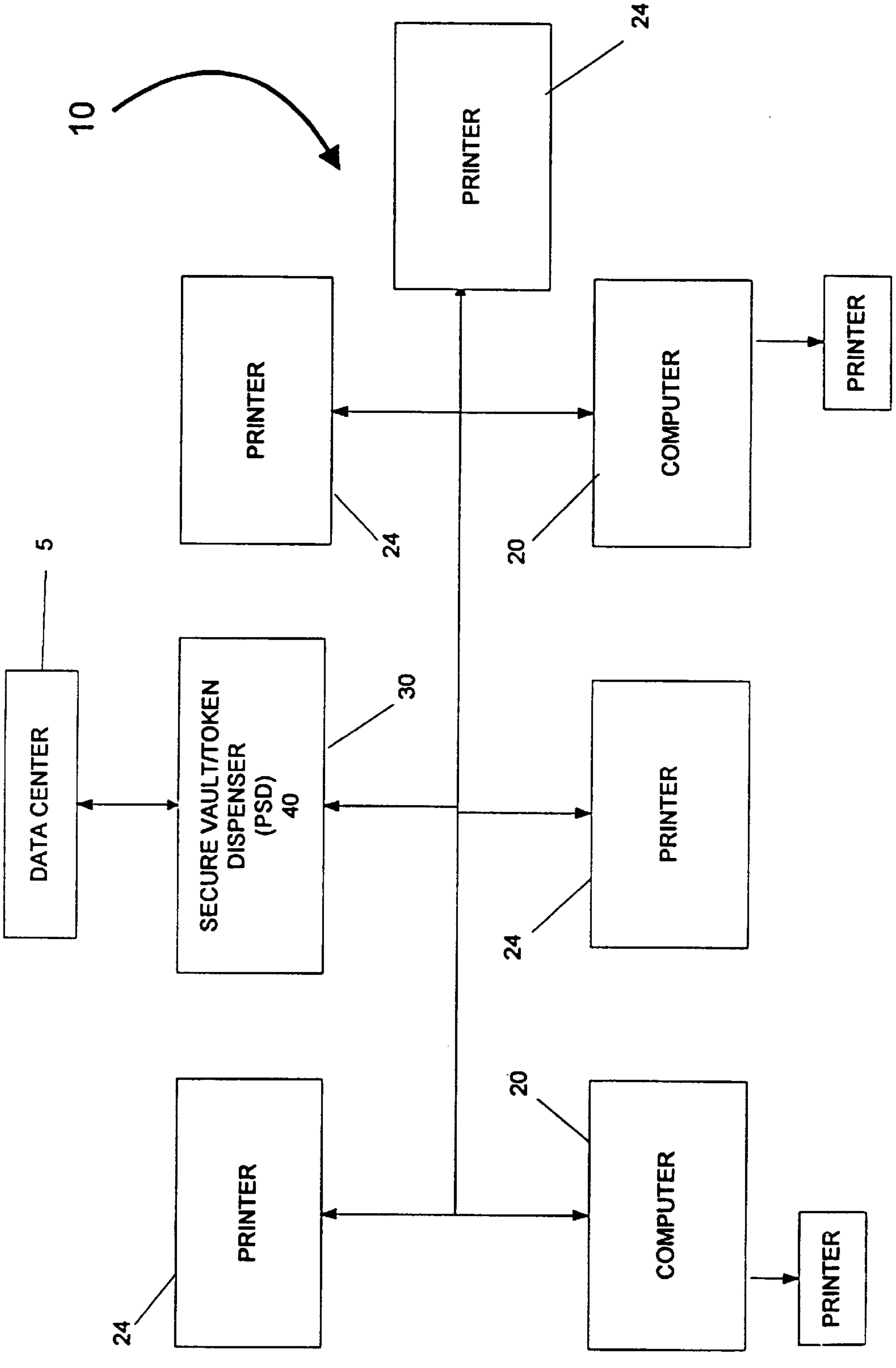
FIG. 1 is a block diagram of a Network Metering System with a PSD coupled to a plurality of dedicated and/or non-dedicated printers on a network in accordance with the preferred embodiment of the present invention.
Figure 2:
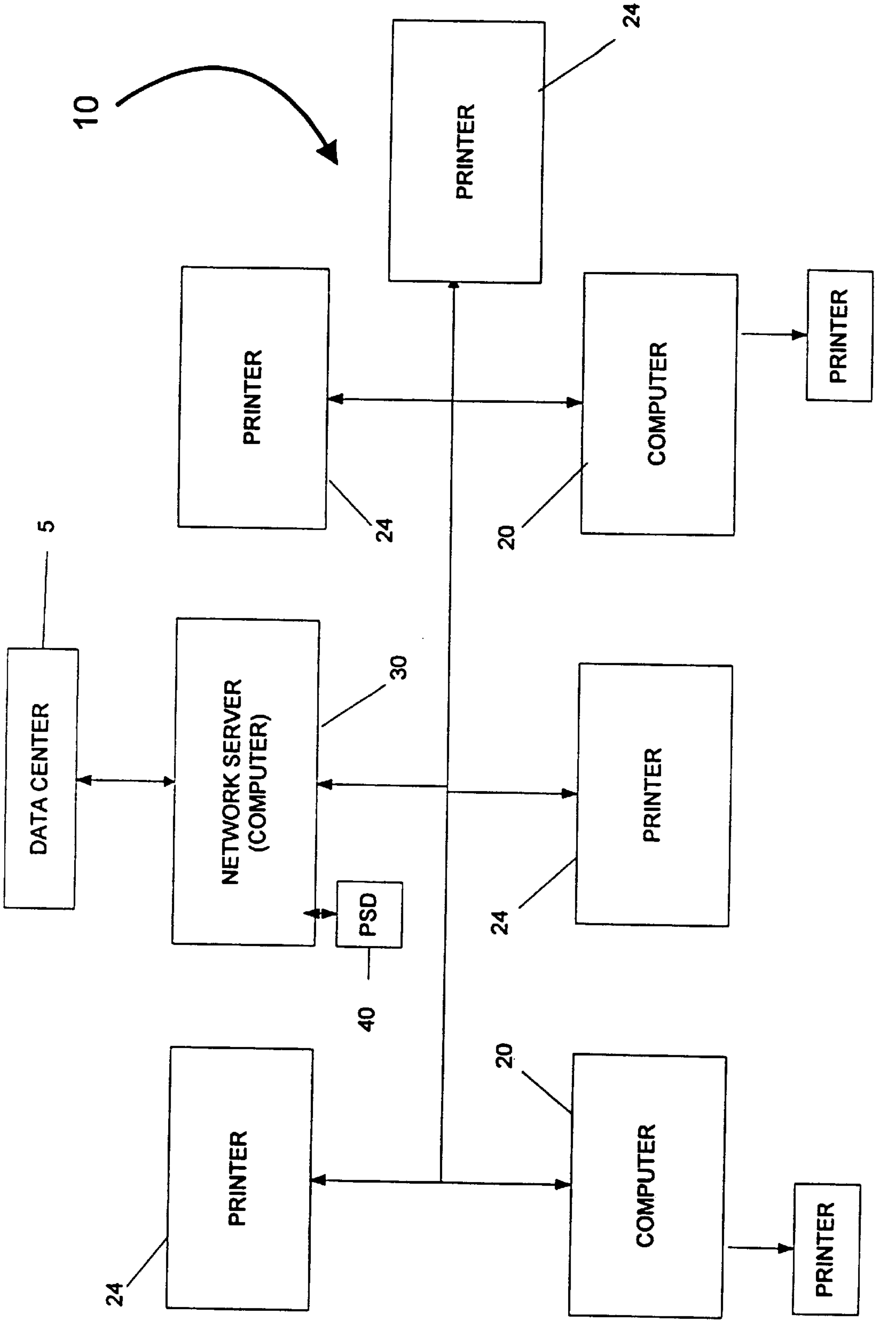
FIG. 2 is a block diagram of a Network Metering System with a secure vault/token dispenser (PSD) coupled to a network server or computer on a network of printer modules in accordance with an alternate embodiment of the present invention.

In describing the present invention, reference is made to the drawings, wherein there is seen in FIGS. 1–2, alternate embodiments of a Network Metering System. FIG. 1 shows the preferred embodiment of the present invention. A Network Metering System, generally designated 10, includes a plurality (six are shown) of printer modules conventionally coupled to a PSD 40 directly connected to a network. Two of the printer modules are non-dedicated printers 22 coupled to personal computers 20 which are coupled to the network. Four of the printer modules are digital printers that are dedicated devices 24, such as mailing machines, which are dedicated to printing postage indicium and meter or PSD related information, such as refill receipts and inspection cards. Each dedicated printer module 24 (shown in more detail in FIG. 3) resembles a conventional digital metering system with optional display, keyboard, and an printer, except that the printer modules do not have an accounting module or PSD attached thereto. The PSD 40 is an accounting module similar to accounting units in conventional electronic postage meters. When evidence of postage payment is needed, printer modules 22 and 24 request the evidence of postage payment directly from PSD 40. PSD 40 also has an optional modem to connect to Data Center 5. The connection can also be made through computer 20 or the printer module's modem.

Referring now to FIG. 2, an alternate embodiment of the present invention is shown with PSD 40 coupled to a network server 30, with the printer modules 24 and 22 requesting postage evidencing from PSD 40 through the network server 30. In yet another alternate embodiment (not shown), PSD 40 may be attached to one of the mailing machines 24 on the network.

Figure 3:
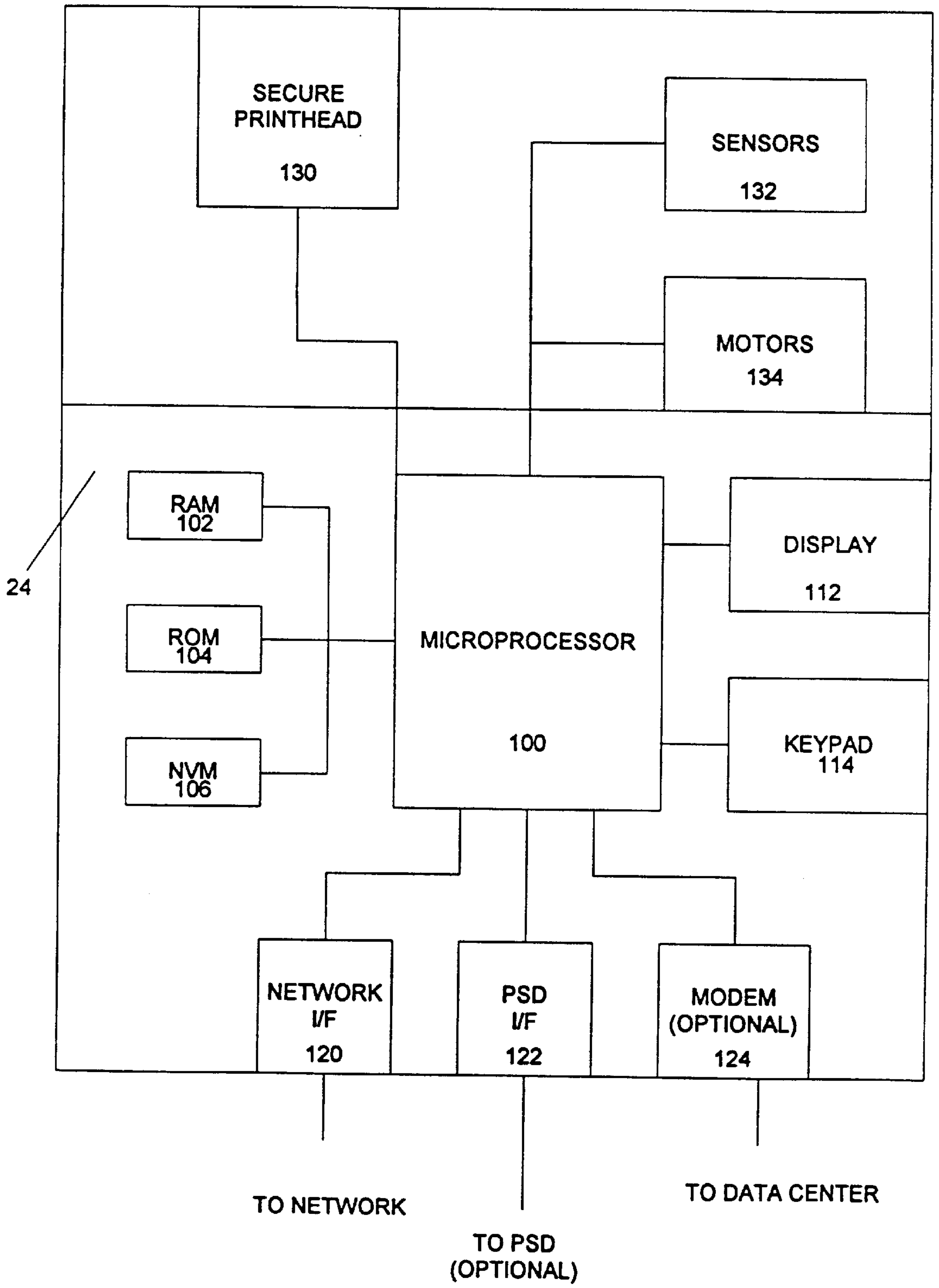
FIG. 3 is a block diagram of the dedicated metering printer modules of FIGS. 1 and 2.

Referring now to FIG. 3, dedicated printer module 24 includes a microprocessor 100 coupled to memory modules RAM 102, ROM 104 and non-volatile memory (NVM) 106 and to user interface modules display 112 and keypad 114. Printer module 24 further includes a network interface 124, a PSD interface 122 and an optional modem 124. ROM 104 contains the operating programs from printer module 24 including a Meter Toolkit 110 which is described below. NVM 106 stores batch or departmental accounting logs for the printer module 24 and a network ID for printer module 24. Printer module 24 physically connects to the network through network interface 124. A PSD may optionally be connected to printer module 24 through PSD interface 122. When connected in this fashion the central PSD need not be used. Communications to Data Center 5 (FIGS. 1 and 2) can be made through optional modem 124. Printer module 24 includes a secure printhead 130 which is controlled by microprocessor 100, sensors 132 for sensing printing functions, and motors 134 for activating printer functions and controlling the flow of mailpieces through the system.

Computer 20 or printer module display 112 and keyboard 114 process the functions for PSD registration and PSD refill. Processing is performed locally by metering software component 110 (referred to herein as "Meter Toolkit"). In the preferred embodiment, Meter Toolkit 110 is a program module with an interface to perform metering operations. Meter Toolkit 110 includes the following components: a transaction handler, a vault interface, a transaction log handler and an optional secure communications handler as described in the previously noted U.S. patent application Ser. No. 08/864,929 and U.S. Pat. No. 4,802,218. Connections to the Data Center 5 can be made locally from the printer module 24 via modem 124. Accounting for debits and credits to the PSD may be logged as transactions in the NVM 106. In this manner, the transaction processing and funds accounting may be centralized on the printer module as if operating as a stand-alone meter. The Meter Toolkit 110 provides standard metering functions, such as dispensing postage, PSD refills, and PSD registration and secure communications. The Meter Toolkit 110 resides in the PSD, the Network Server and the printer/computer modules.

The printer modules may be unsecured (printers 22) or may be securely coupled as described in U.S. patent application Ser. No. 08/864,929, filed May 29, 1997, entitled SYNCHRONIZATION OF CRYPTOGRAPHIC KEYS BETWEEN TWO MODULES OF A DISTRIBUTED SYSTEM and assigned to the assignee of the present invention, or in U.S. Pat. No. 4,802,218, issued to Christopher B. Wright et al and now assigned to the assignee of the present invention.

In the preferred embodiment, the postal funds accounting and the transaction processing occur in the PSD. It will be understood that this is a centralized approach concerning funds accounting and transaction accounting.

In the preferred embodiment of FIG. 1, the Meter Toolkits 110 residing in the printer module 24 and the in PSD 40 operate in conjunction with each other such that the remote requesting printer module 24 and PSD 40 operate collectively as a meter. The Meter Toolkit 110 residing in PSD 40 handles messages from and to the requesting printer module 24 or computer 20, and handles standard metering functions, such as dispensing postage, PSD refills, and PSD registration.

In the alternate embodiment of FIG. 2, the Meter Toolkits 110 residing in the printer module 24 and the in Network Server 30 operate in conjunction with each other such that the remote requesting printer module 24 and Network Server 30 operate collectively as a meter. The Meter Toolkit 110 residing in Network Server 30 handles messages from and to the requesting printer module 24, and handles standard metering functions, such as dispensing postage, PSD refills, and PSD registration, for PSD 40.

Figure 4A:
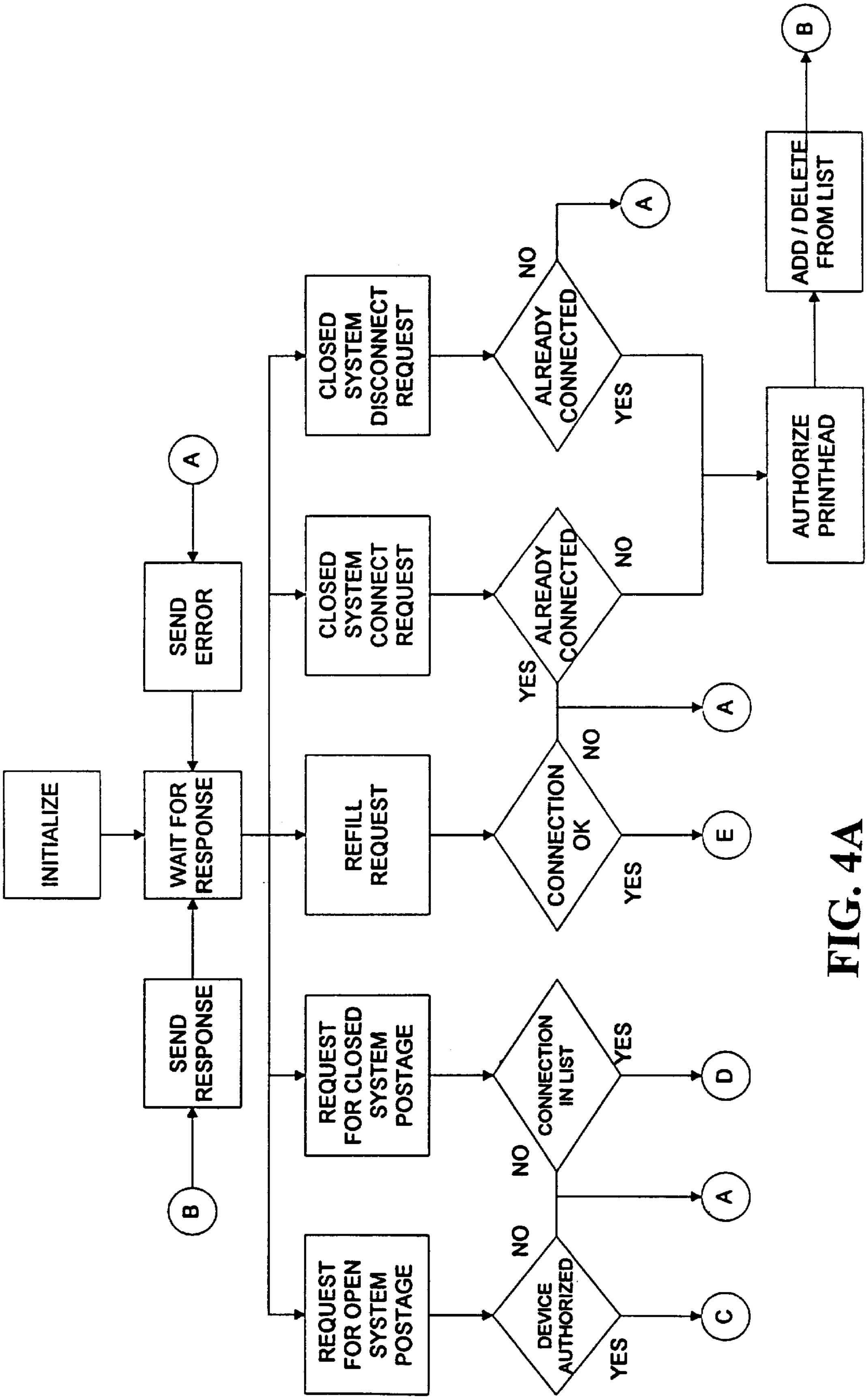
FIG. 4 (4A and 4B) is a flow chart of the preferred method of the Network Metering System of FIG. 1.
Figure 4B:
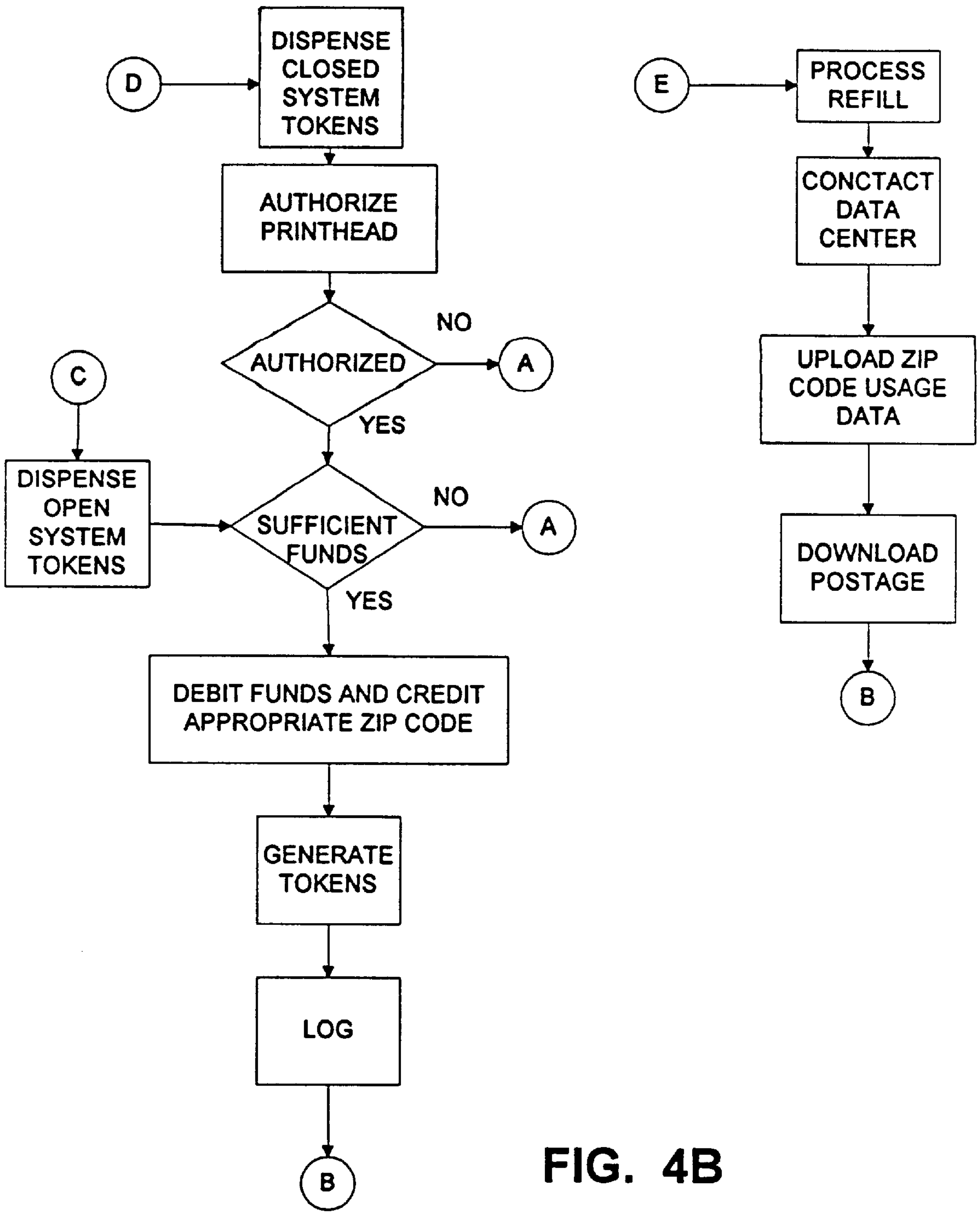

Referring now to FIGS. 4A and 4B, the process of the present invention is shown. At step 400, a PSD is initialized on the network. At step 402, the PSD waits for a request from a printer module. At step 410, the printer module requests an open system evidence of postage. If, at step 412, the printer module is authorized for such evidence of postage, then, at step 414, the PSD begins to respond to the request continuing the process at step 470 below. If the printer module is not authorized, then at step 416 and error is message is sent to the printer module.

At step 420, the printer module requests a closed system evidence of postage. If, at step 422, the printer module is authorized for such evidence of postage, i.e. the printer module connection has been initialized, then, at step 424, the PSD begins to respond to the request. First the printhead is authorized at step 426. When this has been confirmed at step 428 the process continues at step 470 below. If the printer module is not authorized, then at step 416 and error is message is sent to the printer module.

At step 430 a refill request is made by a user of a PC connected to the network or one of the printer modules. If, at step 432, the user is authorized vis entering a PIN or a password, then, at step 434, the refill request is processed. At step 436, the PSD contacts the Data Center. At step 438, the PSD uploads origin zip code usage data, i.e., sub-register information, and, at step 440, postage is downloaded to the PSD from the Data Center. At step 442, the PSD sends a response to the user acknowledging completion of the refill.

At step 450, the printer module requests connection as a closed system whereby a user can determine which printer modules are attached to the network and available for use. This is a convenient feature for remote users and diagnostic purposes. If already connected at step 452, an error message is sent at step 416. If not connected, then at step 454, the PSD authorizes the printhead of the printer module and at step 456 adds the printer module to the authorized list of printers. At step 442, the PSD sends a response to the printer module acknowledging the connection.

At step 460, the printer module requests that it be disconnected as a closed system. If already disconnected at step 462, an error message is sent at step 416. If connected, then at step 464, the PSD disconnects the printhead of the printer module and at step 456 deletes the printer module from the authorized list of printers. At step 442, the PSD sends a response to the printer module acknowledging the disconnection.

When the PSD is dispensing open or closed system evidence of postage, at step 470, it first checks for sufficient funds. If the funds stored in the PSD are insufficient, and error message is sent to the printer. If the funds are sufficient, the PSD, at step 472, debits the master register and credits the appropriate origin zip code sub-register. At step 474, the PSD generates the appropriate, open or closed system, token. At step 476, the PSD logs the transaction and sends a response including the token to the printer module at step 442. The printer module then prints an indicium including the token received from the PSD.

As previously noted, the present invention is capable of producing and issuing closed system tokens through PSD 40. Typically, closed system tokens are printed on dedicated printer modules 24 and open system tokens are printed on non-dedicated printers 22. However, it has been found that open system tokens can be printed on any printer in Network Metering System 10. The basic difference between open and closed system tokens is that the open system tokens include addressee information for security reasons. Since PSD 40 in the present invention can generate both open and closed system tokens, there is no reason why the dedicated printer modules 24 cannot print the open system tokens. Thus, the present invention can be configured to have PSD 40 generate only open system tokens. In this configuration, the PSD 40 does not have to distinguish requests from printer modules 24 or PCs 20 as long as addressee information is available for token requests initiated by printer modules 24.

It is noted that the converse is also true, i.e., every printer module can be a closed system module as long as each printhead authenticates itself to the PSD as follows.

As previously noted, requests from printer modules 24 require a secure communication link between printer modules 24 and the secure token generator, i.e., PSD 40. This is achieved by encrypted communication on the line between PSD 40 and printer modules 24. In the preferred embodiment, separate keys are used for open and closed token generation: a secret key is used for closed systems and a public key system is used for open system to conform to USPS IBIP requirements. In an alternate embodiment, one key, preferably secret, generates both open and closed tokens using same algorithm except for extra steps for generating open system tokens with addressee information.

Figure 5:
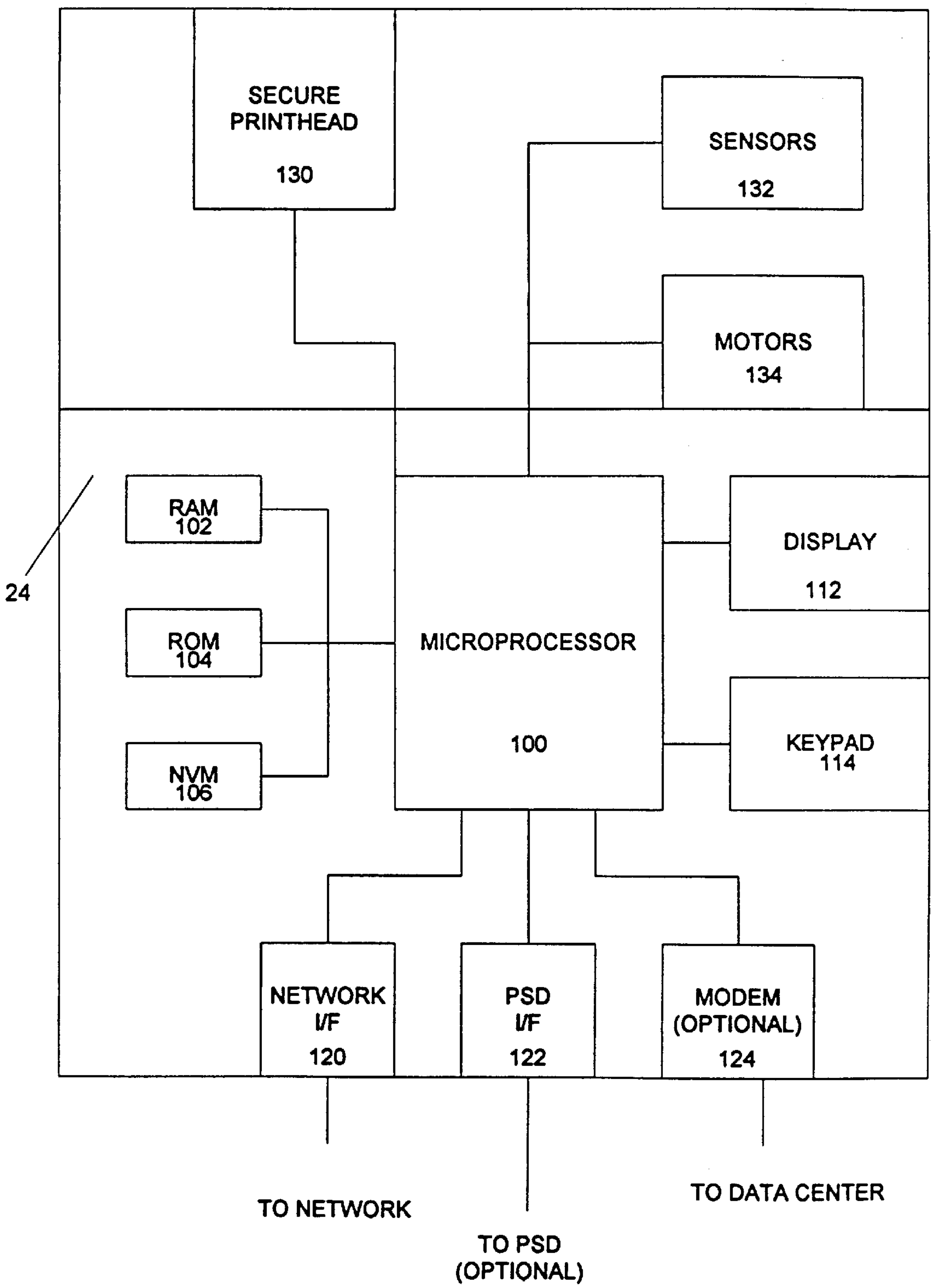
FIG. 5 is a block diagram of the PSD in FIG. 1.
Figure 5:
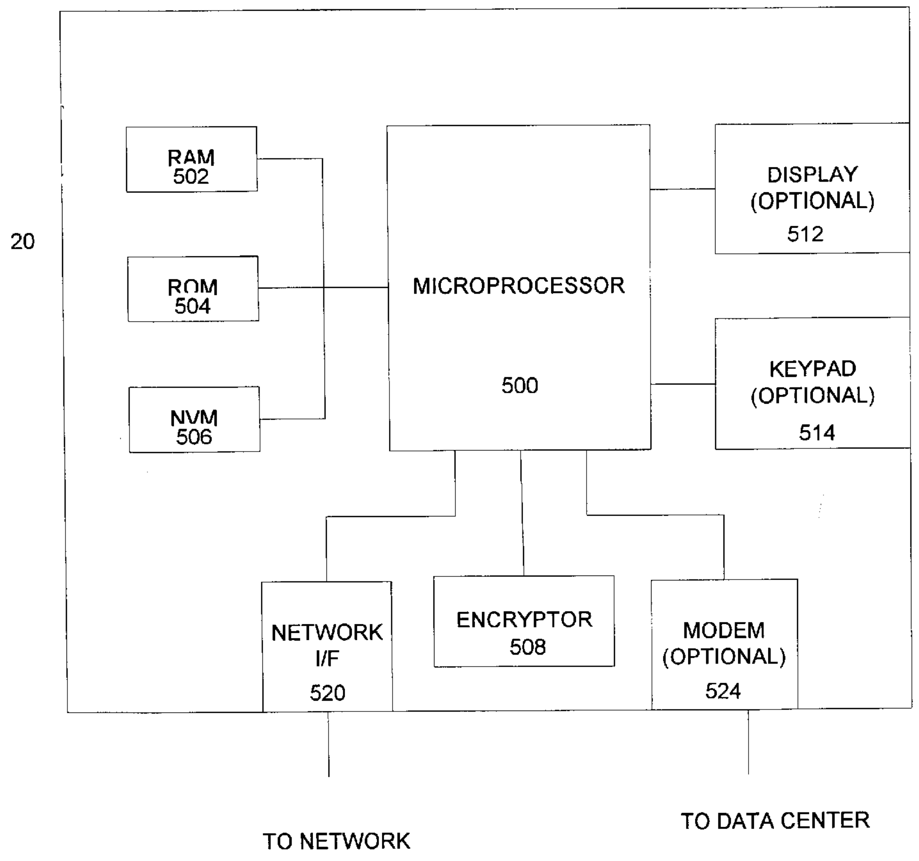

Referring now to FIG. 5, PSD 40 includes a microprocessor 500 coupled to memory modules RAM 502, ROM 504 and non-volatile memory (NVM) 506 and to optional user interface modules display 512 and keypad 514. PSD 40 further includes a network interface 520 and an optional modem 524. ROM 504 contains the operating programs for PSD 40 including a Meter Toolkit 110 which is described above. NVM 506 stores transaction and accounting logs for the PSD 40 and network ID for the PSD 40. PSD 40 physically connects to the network through network interface 520. Communications to a Data Center 5 (FIGS. 1 and 2) are made through optional modem 524. Encryption module 508 is hardware-based co-processor for providing high-speed encryption/digital signature operations.

In previously noted related U.S. patent application Ser. No. 08/993,310 a method is disclosed wherein one set of master postal registers is maintained in PSD 40 and multiple accounting sub-registers for each origin of mailing are maintained in PSD 40. This method allows a request for evidence of postage to include an origin of mailing other than the origin of mailing for the master postal register of the PSD. The sub-registers are sent to the Data Center at time of refill. At that time, the Data Center sends accounting information to the appropriate Postal Service for proper crediting of postal accounting centers.

In accordance with the present invention, when closed system printer module 24 comes online and registers itself with PSD 40, printer module 24 discloses information about its origin of deposit, which may be stored in printer module 24, but could be input by a user. This information is maintained by PSD 40 while printer module 24 is in the network. Should printer module 24 be requested by the user to change origin, the information is sent to PSD 40 and an active list updated to reflect the new origin. Alternatively, the printer module can override this origin zip for a particular mailpiece. This information is maintained by PSD 40 because it will reduce overhead on these communications for debit messages. If printer module 24 is a mailing machine, the number of dispense operations would be great and the savings would be significant. When printer module 24 requests proof of postage payment, PSD 40 will authorize printer module 24 to print, debit the master postal registers and the sub-registers of the appropriate origin zip code. Tokens will be generated using the registered origin information, and the resulting tokens sent back to the requesting printer module 24.

When an open systems printer 22 comes online, the origin information does not need to be given to PSD 40 because its volume of token requests should be smaller. If it is not, then a registration method similar to that described above for the closed system can be used. When printer 22 requests proof of postage payment, PSD 40 debits the master postal registers and the sub-registers of the appropriate origin zip code. Tokens will be generated and the resulting tokens sent back to the requesting printer 22.

It is noted that the preferred embodiment of the present invention has been described for printer devices residing within a local area network (LAN). However, it has been found that open and closed systems can be served by a remote token dispenser over a wire. See, for example, U.S. patent application Ser. No. 08/911,969, filed Aug. 16, 1997 and U.S. patent application Ser. No 08/993,358. Thus, the present invention applies can be extended to a closed system virtual meter.

It will be understood that although the embodiments of the present invention are described as postage metering systems, the present invention is applicable to any value metering system that includes transaction evidencing, such as monetary transactions, item transactions and information transactions. While the present invention has been disclosed and described with reference to embodiments thereof, it will be apparent, as noted above, that variations and modifications may be made therein. It is, thus, intended in the following claims to cover each variation and modification that falls within the true spirit and scope of the present invention.

Personal Post Office and PostPerfect are trademarks of Pitney Bowes Inc.

What is claimed is:

1. A postage metering system comprising:

a postal security device (PSD) including a first processor, secure accounting means, value storage means and digital signature means;

a plurality of printer modules, each of said plurality of printer modules including a processing means and printing means, at least some of said plurality of printers being located remotely from said PSD, wherein at least some of the printer modules include printing means dedicated to printing evidence of postage payment; and means for connecting said at least some of said plurality of printers to the PSD wherein each of said plurality of printer modules requests and obtains said evidence of postage payment as needed for printing an indicium on a mailpiece, said indicium including said evidence of postage payment.

2. The system of claim 1 wherein said plurality of printer modules are connected to the PSD over a network.

3. The system of claim 1 wherein each of said plurality of printer modules requests, obtains and prints said evidence of postage payment on the mailpiece before requesting another evidence of postage payment for another mailpiece.

4. The system of claim 1 wherein the printing means is a mailing machine.

5. The system of claim 1 wherein at least some of the printer modules include a general purpose processor with an unsecured printer coupled thereto for printing said evidence of postage payment.

6. The system of claim 1 wherein the PSD is communicatively coupled to a remote data center for performing conventional metering functions including meter refill.

7. The system of claim 1 wherein the PSD said secure accounting means and said value storage means maintain general accounting information for said PSD and specific accounting information for each of said printer modules.

8. The system of claim 1 wherein said plurality of printer modules include open system and closed system printers, and said means for connecting is a network.

9. The system of claim 1 wherein said at least one of said plurality of printer modules has assigned thereto a different origin zip code than the other printer modules and wherein said PSD generates digital tokens for said at least one of said plurality of printer modules using said different origin zip code.

10. A postage metering system comprises:

a plurality of closed and open meter printer modules operatively connected as part of a metering network;

a single postal security device (PSD) is coupled to the network, the PSD including unique identification and the ability to store postal value and generate digital signatures;

wherein the printer modules and the PSD function as a postage metering network when one of the printer modules initiates a postage metering transaction by requesting evidence of postage payment from the PSD for concluding the postage metering transaction, the PSD receiving the request, generating the evidence of postage payment and sending the evidence of payment to the printer module for subsequent printing.

11. The system of claim 10 wherein the PSD is coupled to the network through a personal computer coupled to the network.

12. The system of claim 10 wherein the PSD is coupled to the network through one of the printer modules.

13. A method for evidencing postage payment, the method comprising the steps of:

connecting a plurality of printer modules as part of a metering network wherein the plurality of printer modules include dedicated printers;

coupling a single postal security device (PSD) to the network, the PSD including unique identification and the ability to store postal value and generate digital signatures;

sending a request for evidence of postage payment from one of the printer modules to the PSD for concluding a postage metering transaction;

generating at the PSD a digital signature as evidence of postage payment in response to the request;

sending the evidence of postage payment to said one of the printer modules; and printing the evidence of postage payment.

14. The method of claim 13 wherein the plurality of printer modules include non-dedicated printers.

15. A transaction evidencing system comprising:

a postal security device (PSD) including a first processor, secure accounting means, value storage means and digital signature means;

a plurality of printer modules, each of said plurality of printer modules including a processing means and printing means, at least some of said plurality of printers being located remotely from said PSD wherein the plurality of printer modules include dedicate printers; and means for connecting said at least some of said plurality of printers to the PSD over a network wherein each of said plurality of printer modules requests and obtains a digital signature as evidence of the transaction for subsequent evidencing of the transaction.

16. The system of claim 15 wherein the plurality of printer modules include non-dedicated printers.

* * * * *

UNITED STATES PATENT AND TRADEMARK OFFICE

CERTIFICATE OF CORRECTION

PATENT NO. : 6,202,057 B1 
DATED : March 13, 2001
INVENTOR(S) : Perry A. Pierce

It is certified that error appears in the above-identified patent and that said Letters Patent is hereby corrected as shown below:

<u>Drawings</u>,
Replace Figure 6 with the attached drawing.

Signed and Sealed this

Fourteenth Day of September, 2004

JON W. DUDAS
*Director of the United States Patent and Trademark Office*